United States Patent Office 3,197,429
Patented July 27, 1965

3,197,429
POLYVINYL ACETATE ADHESIVE MIXTURE
James C. Baatz, West Springfield, Mass., assignor to Shawinigan Resins Corporation, Springfield, Mass., a corporation of Massachusetts
No Drawing. Filed Sept. 21, 1962, Ser. No. 225,375
4 Claims. (Cl. 260—29.6)

This invention relates to the production of improved adhesive compositions based on polyvinyl acetate; more particularly, it relates to aqueous emulsions of polyvinyl acetate compounded with complex mixtures of other ingredients which impart to these emulsions properties heretofore considered antithetical.

To use polyvinyl acetate in emulsion form is of course well known in the adhesive art. Yet, on applying these emulsions to substrates at low temperatures, say at 45° F., there is left on the substrates, upon drying, a chalky, discontinuous film. This defect in filming property has been remedied to some extent by the addition of coalescing agents to the emulsions. These agents are volatile organic solvents; they increase the cold flow of the drying polymer and then they evaporate along with the water forming the emulsion. To improve the filming property of polyvinyl acetate in this manner however, is done at the expense of the redispersibility of the dry polymer film, a property that is rather important for certain applications.

Polyvinyl acetate in film form its not, in the first place, remarkably redispersible in itself. Increased redispersibility is usually achieved by incorporating in the emulsion a hydrophilic, protective colloid which may be either natural or synthetic. Starch and certain types of polyvinyl alcohol illustrate the class of materials suitable for this function.

In spite of these developments, however, there remains a need for aqueous polyvinyl acetate emulsions which can deposit completely water redispersible films and yet form such films at low temperatures.

It is therefore an object of this invention to provide aqueous polyvinyl acetate emulsions which combine the mutually adverse properties of low filming temperature and redispersibility of film. It is also intended that these adhesive emulsions shall have high cohesive strength when wet, i.e., they shall have excellent "wet tack." Further, the emulsions shall be stable to consecutive freezing and thawing, shall suffer little change in viscosity upon dilution and shall tolerate such liquids as carbon tetrachloride and the lower alkyl ethers of ethylene glycol.

These and other objects have been accomplished by mixing an emulsion of polyvinyl acetate with an aqueous solution of certain types of polyvinyl alcohol and another solution containing thiourea or a thiocyanate as well as other ingredients such as starch or animal glue, boric acid and so on.

The following examples will illustrate typical embodiments of the mixtures. They are not intended to limit the invention in any manner. The compositions and their significant properties are summarized in tabular form.

The compositions below, as shown by the emulsion and film properties measured, all meet the requirements set for the adhesive compositions of the invention.

Good wet tack is that property of an adhesive which is evidenced by the formation of stringy legs when two surfaces coated with a thin wet film of the adhesive are slowly separated.

Filming ability at 45° F. is scored excellent when the compounded adhesive emulsion, after application to a substrate and upon drying in air, leaves a uniform, non-chalky and continuous film. A few isolated areas of whiteness on a continuous film still earns a rating of good low temperature filming ability for the emulsion producing that film.

| Example | I | II | III | IV | V |
|---|---|---|---|---|---|
| | Parts by weight | | | | |
| Composition: | | | | | |
| Polyvinyl acetate emulsion— | | | | | |
| Gelva S-51 | 53.04 | 49.1 | 54.0 | | |
| Gelva S-55H | | | | 34.3 | 55.0 |
| Thiourea | 1.92 | 1.72 | 3.7 | | 1.92 |
| NH₄CNS | | | | 1.8 | |
| Animal glue | 0.33 | 0.37 | 0.41 | | 0.33 |
| Starch | | | | 10.0 | |
| Boric acid | 0.69 | 0.49 | 0.55 | 1.20 | 0.69 |
| Acetic acid, glacial | 0.008 | 0.003 | 0.003 | | |
| Phosphoric acid (85%) | | | | 0.1 | |
| Water | 14.82 | | | 23.1 | |
| Gelvatol 70/10 | 0.05 | | | 0.04 | |
| Gelvatol 20/30 | 1.64 | 1.41 | 1.09 | 7.4 | 1.09 |
| Gelvatol 20/60 | 2.43 | 3.18 | 2.45 | | 2.45 |
| Gelvatol 20/90 | 0.82 | 1.76 | 1.36 | | 1.36 |
| Water | 23.22 | 42.2 | 36.7 | 14.4 | 37.2 |
| Tamol 731 (25%) | 0.022 | | | | |
| Clay | 1.00 | | | 7.2 | |
| Dye, Fungicide | | | | 0.5 | |
| Emulsion Properties: | | | | | |
| Total solids (percent weight) | 37.9 | 35.9 | 39.0 | 47.1 | 38.8 |
| Viscosity, c.p.s | 3,810 | 4,820 | 3,556 | 4,100 | 3,200 |
| Tack (wet) | excellent | excellent | v. good | v. good | v. good |
| Film Properties: | | | | | |
| 45° F. filming | excellent | good | v. good | good | good |
| Redispersibility | excellent | v. good | v. good | v. good | good |
| Wood bonding— | | | | | |
| Average strength (p.s.i.) | 3,207 | 3,700 | 3,333 | 3,288 | 3,700 |
| Wood failure (ave. percent) | 58 | 78 | 44 | 50 | 61 |

Excellence in redispersibility is that degree of redispersibility which causes a dry film of the present compositions to redisperse much like a wet film of ordinary emulsions would, except that it occurs more slowly. Redispersibility is complete, although usually accompanied by very slight to slight evidence of shredding of the film.

The wood bond strength is the average shearing force, in pounds per square inch, necessary to break maple blocks bonded by the compositions. The differences in average strengths given for the above examples is not too significant because of the various factors influencing these values, which factors cannot be controlled practically with as much precision as would be desired, e.g., wood grain structure, internal defects of blocks, rate of shear and so on. Nevertheless, wood bonding characteristics are considered acceptable when strength exceeds 3000 p.s.i., and when more than 40% of the test specimens break because of wood failure rather than because of adhesive bond failure. Each composition is tested on 10 specimens by means of a hydraulic press.

Emulsion viscosities are measured at room temperature on a Brookfield LV viscosimeter, employing a No. 3 spindle at 12 r.p.m.

"Gelva S-51" polyvinyl acetate emulsion is a commercially available product. The particular batch used here had a minimum solids content of 55% by weight, a room temperature viscosity of 4000 centipoises and a pH of 4.5. The number average molecular weight of the polymer was approximately 600,000 and the particle size ranged between 1 and 2 microns in diameter. Similarly, "Gelva S-55H" was a commercially available aqueous emulsion of polyvinyl acetate of the following characteristics: minimum total solids, 55% by weight; room temperature viscosity, 1650 centipoises; pH, 4.5; number average molecular weight, approximately 50,000; and particle size range, from 0.1 to 5.0 microns in diameter. Both emulsions contained polyvinyl alcohol as stabilizer.

Two types of polyvinyl alcohols were employed in the examples: "Gelvatol 70/10," a low molecular weight resin having a 20° C. viscosity of 5 centipoises as a 4% by weight solution in equivolume water—isopropyl alcohol, and containing approximately 70% by weight of unhydrolyzed polyvinyl acetate; the other type, namely, "Gelvatol 20/30," "Gelvatol 20/60" and "Gelvatol 20/90" polyvinyl alcohols, had residual polyvinyl acetate contents of approximately 21% but differed in that their viscosities as 4% aqueous solutions at 20° C. were 5, 23 and 40 centipoises respectively.

The particular animal glue used was a product designated commercially as PCS1XM. It is a standard dry hide glue, i.e., an impure gelatin obtained by boiling water extraction of animal tissue. Tamol 731 is a 25% aqueous solution of a sodium salt of a polymeric carboxylic acid, a polyacrylate type.

No critical procedure need be employed to prepare the adhesive emulsion of this invention. Handling the ingredients is favored however by forming a separate solution of the polyvinyl alcohols, a time consuming step which is best done at 50 to 60° C., and another solution or slurry of the remaining materials: boric acid, starch or glue, clay, etc. When starch is used, the temperature of the latter operation should be kept at 40° C. or less in order to avoid gelatinization; neither should such a solution be kept at that maximum temperature for more than 4 hours. Thiocyanate salts, when used, should be dissolved in a polyethylene, glass or aluminum container. Once prepared, the solutions are added stepwise to the polyvinyl acetate emulsion and the blending is continued for about 20 minutes.

The polyvinyl acetate emulsions usable in this invention are characterized by a minimum solids content of 55% by weight, room temperature viscosities ranging from 350 to 5000 centipoises and a pH between 3.5 and 5.5. The number average molecular weight of the polymer in these aqueous dispersions may vary between 20,000 and 1,000,000 and the average particle diameter, from 0.2 to 2 microns. The preferred emulsions within this class are those which are not free-filming at room temperature and are stabilized with polyvinyl alcohol. The net polyvinyl acetate content of the present adhesive compositions should be between about 18 and 40% by weight, the preferred range being from about 25 to about 30%.

Any partially hydrolyzed polyvinyl acetate may be used in the adhesive compositions that has a residual acetate group content of less than 50% by weight, calculated as polyvinyl acetate. The viscosity of these polyvinyl alcohols, as 4% aqueous solutions at 20° C. may range from 1 to 70 centipoises. The preferred types will have a viscosity of 4 to 45 centipoises and a residual polyvinyl acetate content of 15 to 25%. The compositions may contain from about 2.5 to 8% polyvinyl alcohol by weight, the range of 3.5 to 6.5% being the preferred one. The selection of the type or types of polyvinyl alcohol actually employed in a given preparation is dependent on the viscosity of the original polyvinyl acetate emulsion used and the viscosity desired in the final adhesive product.

A special type of polyvinyl alcohol, "Gelvatol 70/10," may be employed, if desired, as anti-foaming agent; 0.03 to 0.1% of the total composition weight is satisfactory.

Other ingredients added to the present compositions for their particular adhesive properties are such materials as liquid animal glue, bone glue, dry hide glue, gelatin, corn starch, dextrin, starch ethers and so on. When protein adhesives are selected, their concentration in the adhesive mixture should be kept below 0.75% lest creaming and separation occur. The preferred concentrations of protein glues are from 0.05 to 0.5% of the total adhesive composition. Carbohydrate materials, on the other hand, may be used in quantities ranging from 10 to 40% of the total composition weight, the preferred percentages being from 10 to 20%.

Any compound capable of providing a $-[B(OH)_2]$ group is usable. Boric acid is preferred. The quantity employed is dependent on the amount of polyvinyl alcohol present in the adhesive composition. Boric acid-polyvinyl alcohol weight ratios of 0.03 to 0.20 are acceptable while ratios of 0.06 to 0.16 function best.

Thiourea and thiocyanate have been found to be decisive factors for imparting low temperature filming ability to the present adhesive emulsions. Quantities of 0.5 to 5.0% of the total composition weight will achieve such results. The preferred range is from 1.5 to 4.0%. In the case of thiocyanate, the metallic cation may be any of the monovalent alkali metals.

Clay may be added to the compositions in quantities ranging from 0 to 8% by weight. The grades selected should have an average particle diameter not exceeding 10 microns. Other inert materials with a plate-like crystal habit may be substituted for this material, mica for instance. Finally, specialized ingredients such as dyes and fungicides may be used in small quantities for particular applications.

The compounded adhesive emulsions of this invention should have a minimum solids content of 30% by weight and preferably within the range of 35 to 50%. The room temperature viscosity of the emulsions can vary between 2000 to 6000 centipoises.

Although these compositions have proved to be excellent wood bonding adhesives, their use of course is not limited to such applications. They may obviously be employed to advantage wherever quick tack, redispersibility of film and low temperature filming capacity are required. The field of packaging affords excellent opportunities for the compositions. Many applications may benefit from only one of the peculiar characteristics of these emulsions. For instance, the excellent redispersibility of the films recommends the use of the emulsions in processes where ease of cleaning of the machinery involved is a necessity. The man skilled in the art will readily visualize further possibilities.

What is claimed is:

1. An adhesive composition capable of forming at 45° F. a continuous, non-chalky, water redispersible film, which comprises: (A) an aqueous dispersion of polyvinyl acetate in amount sufficient to provide from 18 to 40% of polyvinyl acetate in the final composition; (B) from 0.5 to 5% of a compound selected from the group consisting of thiourea, ammonium thiocyanate and the monovalent alkali metal thiocyanates; (C) from 2.5 to 8% of polyvinyl alcohol, in aqueous solution, said polyvinyl alcohol having a 20° C. viscosity of 1 to 70 centipoises as a 4% by weight aqueous solution, and a residual unhydrolyzed polyvinyl acetate content of less than 50% by weight; and boric acid in a weight ratio of boric acid to the polyvinyl alcohol of 0.03 to 0.20.

2. The adhesive composition of claim 1 wherein 1.5 to 4% thiourea is used.

3. The adhesive composition of claim 2 wherein 3.5 to 6.5% of the polyvinyl alcohol is added, said polyvinyl alcohol having a 20° C. visocity of 4 to 45 centipoises as a 4% aqueous solution, and a residual polyvinyl acetate content of 15 to 25% by weight.

4. The adhesive composition of claim 1 containing about 1.8% by weight of ammonium thiocyanate.

References Cited by the Examiner

UNITED STATES PATENTS

| 2,143,482 | 1/39 | Hermann et al. | 260—30.8 |
| 2,399,456 | 4/46 | Yates et al. | 260—30.8 |
| 2,850,468 | 9/58 | Giggey et al. | 260—29.6 |

MURRAY TILLMAN, *Primary Examiner.*

LEON J. BERCOVITZ, *Examiner.*